US010336223B2

(12) United States Patent
Kim et al.

(10) Patent No.: US 10,336,223 B2
(45) Date of Patent: Jul. 2, 2019

(54) VENTILATION SEAT FOR VEHICLE

(71) Applicant: HYUNDAI MOTOR COMPANY, Seoul (KR)

(72) Inventors: Mu Young Kim, Gunpo-si (KR); Sang Ho Kim, Incheon (KR); Chan Ho Jung, Gunpo-si (KR); Jong Moon Yoo, Hwaseong-si (KR); Bong Ku Kim, Seoul (KR); Seon Chae Na, Yongin-si (KR); Soo Hyun Moon, Hwaseong-si (KR); Joo Hwan Son, Anyang-si (KR); Jun Yeol Heo, Suwon-si (KR); Young Bok Sung, Hwaseong-si (KR); Tae Hyung Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/369,480

(22) Filed: Dec. 5, 2016

(65) Prior Publication Data
US 2018/0093595 A1    Apr. 5, 2018

(30) Foreign Application Priority Data

Oct. 5, 2016   (KR) .................. 10-2016-0128142

(51) Int. Cl.
*B60N 2/56*   (2006.01)
(52) U.S. Cl.
CPC ......... *B60N 2/5621* (2013.01); *B60N 2/5642* (2013.01); *B60N 2/5657* (2013.01)

(58) Field of Classification Search
CPC ...... B60N 2/56; B60N 2/5621; B60N 2/5642; B60N 2/5657
See application file for complete search history.

(56) References Cited

U.S. PATENT DOCUMENTS

| 6,578,910 | B2 | 6/2003 | Andersson et al. |
| 6,929,322 | B2 | 8/2005 | Aoki et al. |
| 9,751,439 | B2* | 9/2017 | Taguchi ................. A47C 31/02 |
| 2007/0101729 | A1* | 5/2007 | Aoki .................. B60H 1/00285 62/3.61 |
| 2009/0096256 | A1* | 4/2009 | Kikuchi .............. B60R 11/0264 297/180.1 |
| 2013/0020841 | A1* | 1/2013 | Oota .................... B60N 2/5657 297/180.1 |
| 2016/0114709 | A1* | 4/2016 | Kim ..................... B60N 2/5628 454/120 |

(Continued)

FOREIGN PATENT DOCUMENTS

| GB | 2438065 A | * 11/2007 | .......... B60N 2/5621 |
| JP | 2004-008334 A | 1/2004 | |
| JP | 2009090016 A | * 4/2009 | ......... B60R 11/0264 |

(Continued)

*Primary Examiner* — Ryan D Kwiecinski
(74) *Attorney, Agent, or Firm* — McDonnell Boehnen Hulbert & Berghoff LLP

(57) ABSTRACT

A ventilation seat for a vehicle is provided. The ventilation seat is configured such that a through channel to directly discharge air is formed in a seat pad so that air supplied from an air supply unit is discharged over the seat pad through the through channel, whereby the through channel or the like can be prevented from becoming narrow or being blocked due to the weight of an occupant, resulting in increased or maximize air discharge rate.

5 Claims, 9 Drawing Sheets

(56) References Cited

U.S. PATENT DOCUMENTS

| | | | |
|---|---|---|---|
| 2017/0240078 A1* | 8/2017 | Ishii | B60N 2/5642 |
| 2018/0022252 A1* | 1/2018 | Arata | B60N 2/56 297/452.42 |

FOREIGN PATENT DOCUMENTS

| | | | | |
|---|---|---|---|---|
| JP | 2014094623 A | * | 5/2014 | |
| JP | 5998860 B2 | * | 9/2016 | |
| KR | 20-0222066 | | 5/2001 | |
| KR | 10-1180702 B1 | | 9/2012 | |
| KR | 10-1371310 B1 | | 3/2014 | |
| KR | 10-20140089301 A | | 7/2014 | |
| KR | 20160050131 A | | 5/2016 | |
| KR | 10-1637704 B1 | | 7/2016 | |
| WO | WO-2014003143 A1 | * | 1/2014 | A47C 31/02 |
| WO | WO-2014104859 A1 | * | 7/2014 | B60N 2/5635 |

\* cited by examiner

VENTILATION SEAT FOR VEHICLE

CROSS-REFERENCE TO RELATED APPLICATION

This application claims the benefit of priority under 35 U.S.C. § 119(a) to Korean Patent Application No. 10-2016-0128142, filed on Oct. 5, 2016, the entire contents of which are incorporated herein by reference.

BACKGROUND

(a) Technical Field

The present disclosure relates to a ventilation seat for a vehicle. More particularly, the present disclosure relates to a ventilation seat configured such that the air discharge rate is increased or maximized, and a channel or the like through which air flows can be prevented from narrowing or being blocked due to the weight of an occupant who sits on the seat.

(b) Background Art

If an occupant sits on a vehicle seat for an extended period of long time, there may be poor ventilation around a body portion of the occupant (e.g., the hips of the occupant) in close contact with the seat. As a result, the occupant may experience discomfort or unpleasantness due to sweat from the body portion in close contact with the seat.

In order to address problems resulting from poor ventilation, ventilation seats have been provided in some vehicles. The ventilation seats are configured so that fresh air is discharged from the surface of a seat via a duct from a vehicle air conditioner in order to provide a pleasant ride and additional comfort to an occupant.

An example conventional channel-type ventilation seat 200 and an example conventional mat-type ventilation seat 300 are described below with reference to FIGS. 1A-1C and 2A-2B.

FIGS. 1A-1C are views showing an example conventional channel-type ventilation seat 200.

The conventional channel-type ventilation seat 200 includes a seat pad 210 and a sponge slab 220 placed on the seat pad 210.

A duct connection hole 212 is formed in a lower surface of the seat pad 210, and distribution channels 214 communicating with the duct connection hole 212 are formed in an upper surface of the seat pad 210.

A plurality of circular air discharge holes 222 are formed in the slab 220 at positions corresponding to the channels 214.

In this regard, the slab 220 is placed on the upper surface of the seat pad 210 such that the channels 214 of the seat pad 210 correspond to the air discharge holes 222 of the slab 220, and a duct (not shown) coupled with an air blower (not shown) is coupled to the duct connection hole 212 of the seat pad 210.

In such an existing conventional channel-type ventilation seat, the channels 214 of the seat pad 210 and the air discharge holes 222 of the slab 220 must precisely match or align with each other, so as to provide smooth air flow and prevent a loss in air flow.

In the conventional channel-type ventilation seat 200, air flows from the air blower and is distributed into the channels 214 of the seat pad 210 via the duct. Thereafter, the air is discharged through the air discharge holes 222 formed in the slab 220 provided over the channels 214, thus providing fresh air to the occupant.

However, in practice, during a process of placing the slab 220 on the seat pad 210, the channels 214 of the seat pad 210 may not precisely match or align with the air discharge holes 222 of the slab 220. In other words, the slab 220 may be eccentrically assembled with the seat pad 210, causing an interruption or loss of air flow.

Further, with reference to FIG. 10, another problem with the conventional channel-type ventilation seat 200 is that the slab 220 and the seat pad 210 are pressed by the weight (F) of the occupant, and as a result the channels 214 of the seat pad 210 and the air discharge holes 222 of the slab 220 may be deformed and/or blocked.

FIGS. 2A and 2B are views showing an example conventional mat-type ventilation seat 300.

The conventional mat-type ventilation seat 300 includes a seat pad 310, as well as a non-woven fabric 320 and a mat 330 that are successively stacked on a lower surface of the seat pad 310.

A plurality of circular air discharge holes 312 are vertically formed in the seat pad 310.

Air via holes 322 corresponding to the respective air discharge holes 312 of the seat pad 310 are formed in the non-woven fabric 320.

A duct connection hole 334 is formed in a central portion of the mat 330. A plurality of air guide protrusions 332, which come into close contact with a lower surface of the non-woven fabric 320, are provided on an upper surface of the mat 330.

In the conventional mat-type ventilation seat 300, when the non-woven fabric 320 and the mat 330 are stacked on the lower surface of the seat pad 310, the air discharge holes 312 of the seat pad 310 and the air via holes 322 of the non-woven fabric 320 match with each other, and the non-woven fabric 320 and the mat 330 are spaced apart from each other by a vertical thickness provided by the air guide protrusions 332, to allow the flow of air.

When the non-woven fabric 320 is placed on the lower surface of the seat pad 310, the air discharge holes 312 of the seat pad 310 and the air via holes 322 of the non-woven fabric 320 must precisely match or align with each other, to provide smooth air flow.

Therefore, air supplied from an air blower via the duct is discharged through the air via holes 322 of the non-woven fabric 320 and the air discharge holes 312 of the seat pad 310 via the space between the air guide protrusions 332 of the mat 330, thus providing fresh air to the occupant.

However, in practice, during a process of placing the non-woven fabric 320 on the lower surface of the seat pad 310, the air discharge holes 312 of the seat pad 310 may not precisely match or align with the air via holes 322 of the non-woven fabric 320. In other words, the non-woven fabric 320 may be eccentrically assembled with the seat pad 310, causing an interruption or loss of air flow.

Further, with reference to FIG. 2B, another problem with the conventional mat-type ventilation seat 300 is that the seat pad 310 may be pressed by the weight (F) of the occupant, and as a result the air discharge holes 312 formed in the seat pad 310 may be deformed and/or blocked.

Unless otherwise indicated herein, the materials described above in this section are not prior art to the claims and are not admitted to be prior art by inclusion in this section.

SUMMARY OF THE DISCLOSURE

The present disclosure has been made to solve the above-described problems associated with existing ventilation seats.

An object of the present disclosure is to provide a ventilation seat for a vehicle, where the ventilation seat is configured such that a through channel to directly discharge air is formed in a seat pad so that air supplied from an air supply unit is discharged over the seat pad through the through channel, whereby the air discharge rate can be increased or maximized, and the through channel or the like can be prevented from becoming narrow or being blocked due to the weight of an occupant.

In one aspect, the present disclosure provides a ventilation seat for a vehicle, the ventilation seat including: a seat pad formed with two or more rows of through channels that extend in desired directions and vertically pass through the seat pad; an insert duct attached to a lower surface of the seat pad and configured to distribute air into the through channels; and a cover configured with an air inlet hole through which air is supplied into the insert duct, the cover being attached to the lower surface of the seat pad while covering the insert duct.

In an example embodiment, the through channels include: two or more rows of front through channels extending toward a front portion of the seat pad, based on a position at which the insert duct is attached to the seat pad; and two or more rows of rear through channels extending toward a rear portion of the seat pad.

In another example embodiment, the insert duct is formed to have a hollow structure with air distribution holes formed at the insert duct, the number of which corresponds to the number of through channels, and with an air supply hole formed in a lower surface of the insert duct and coupled with an air supply unit.

In still another example embodiment, a duct insert depression is formed in the lower surface of the seat pad so that the insert duct is inserted and seated into the duct insert depression.

In yet another example embodiment, a depth of the duct insert depression is the same or substantially the same as a vertical thickness of the insert duct.

In still yet another example embodiment, a movement restriction depression configured to restrict movement of the insert duct is further formed in a bottom of the duct insert depression of the seat pad.

In a further example embodiment, a movement restriction protrusion configured to be inserted into the movement restriction depression is further formed on an upper surface of the insert duct.

Other aspects and example embodiments of the disclosure are discussed herein.

It is to be understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are further discussed herein.

BRIEF DESCRIPTION OF THE DRAWINGS

The above and other features of the present disclosure will now be described in detail with reference to certain example embodiments thereof illustrated in the accompanying drawings which are given hereinbelow by way of illustration only, and thus are not limitative of the present disclosure, and wherein.

Figure 1A:
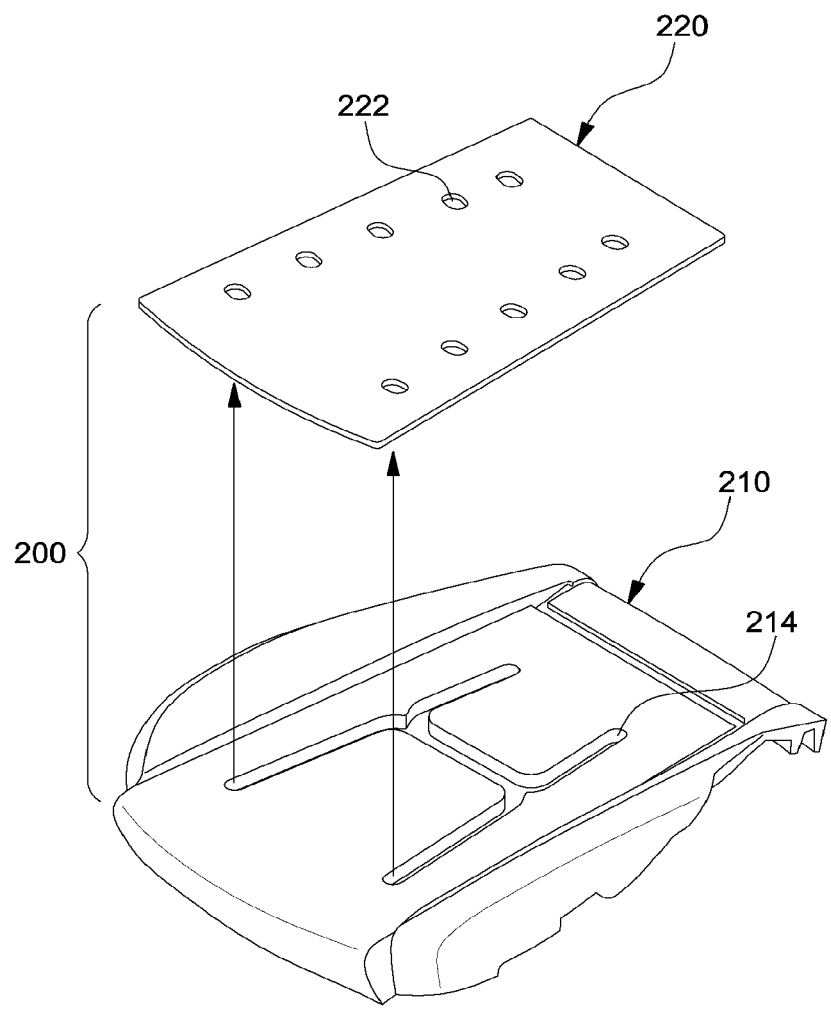
FIGS. 1A to 1C are views showing a conventional channel-type ventilation seat.
Figure 1B:
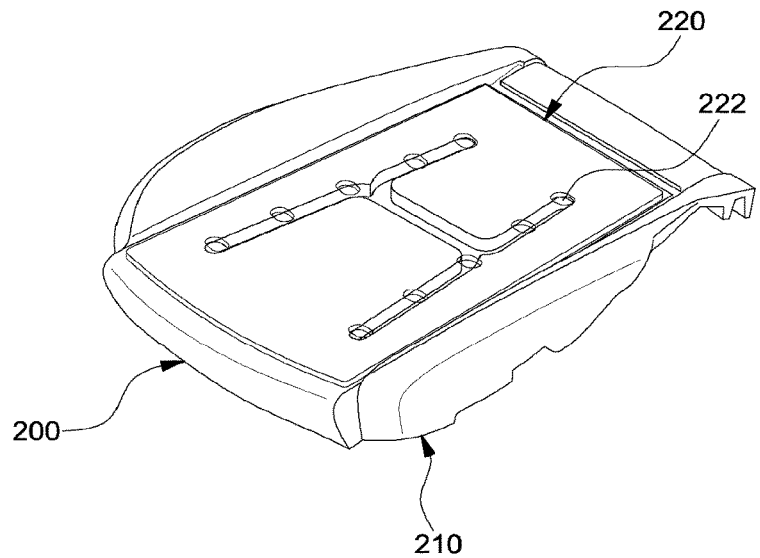
Figure 1C:
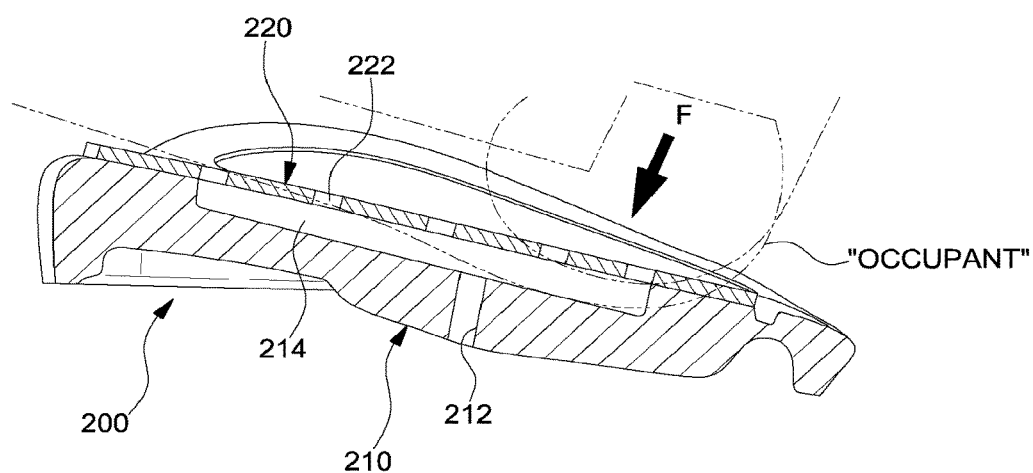
Figure 2A:
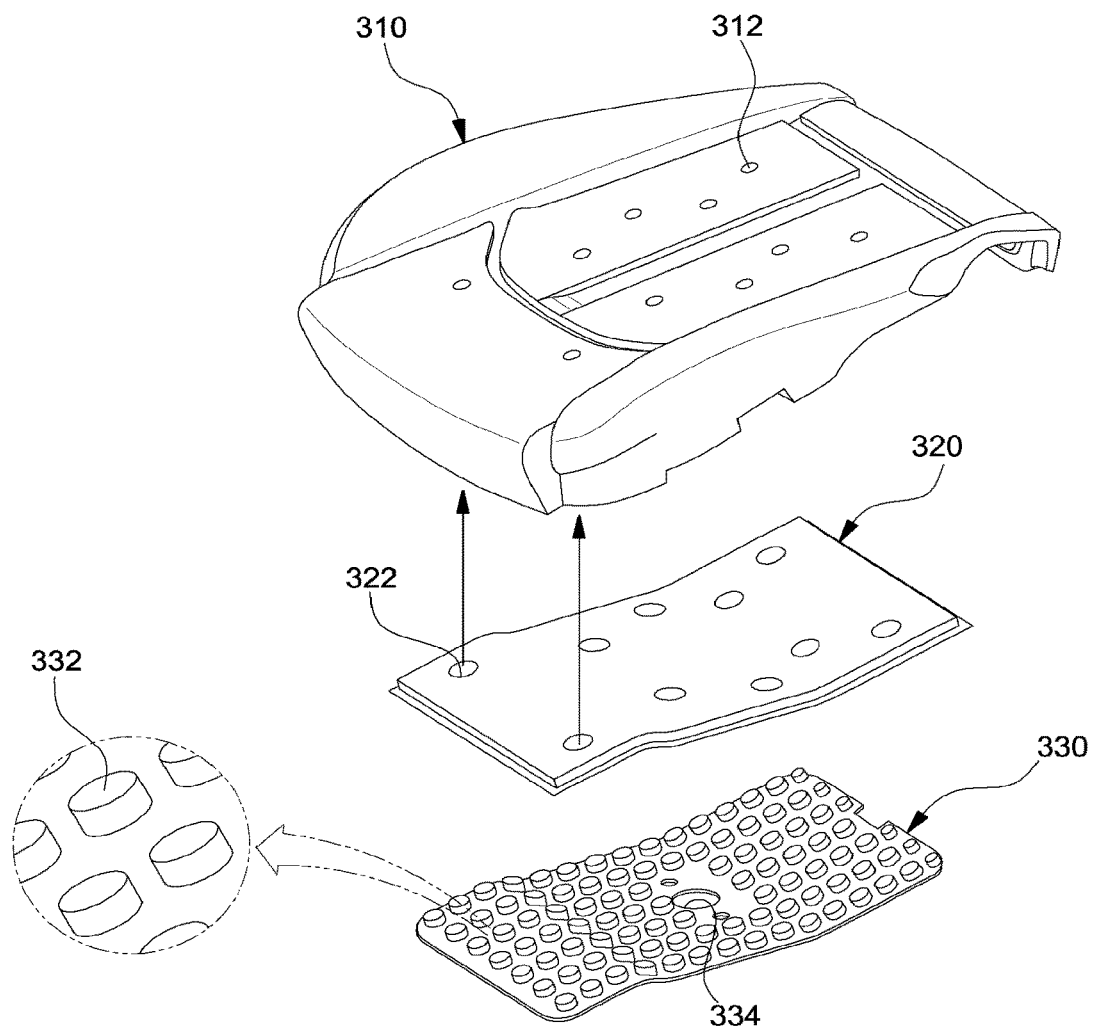
FIGS. 2A and 2B are views showing a conventional mat-type ventilation seat.
Figure 2B:
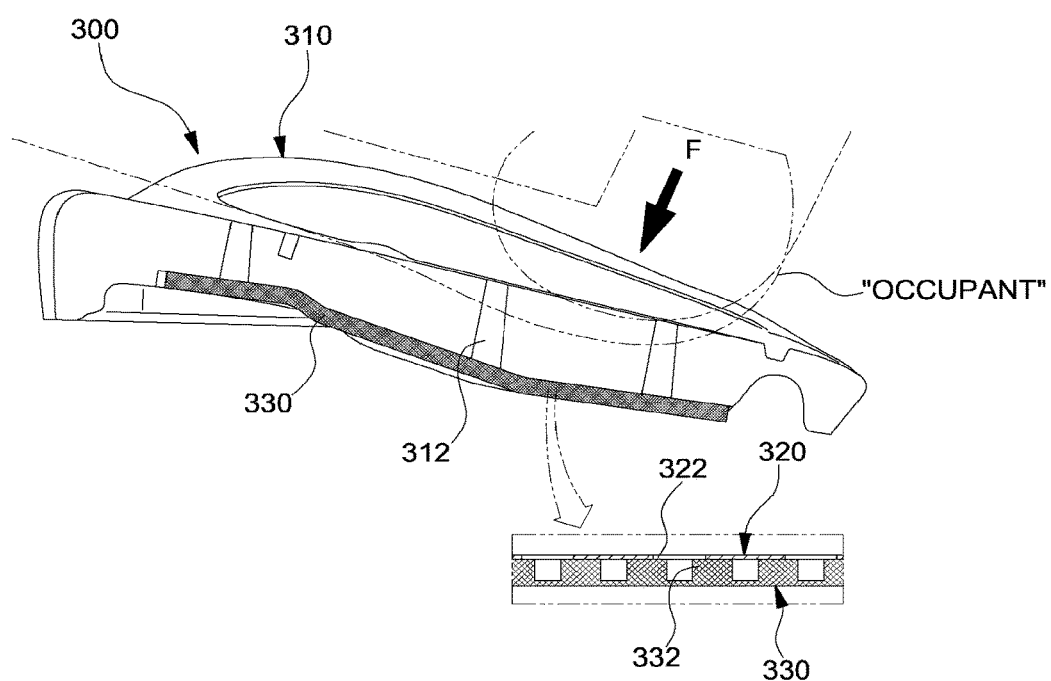

It should be understood that the appended drawings are not necessarily to scale, presenting a somewhat simplified representation of various example features illustrative of the basic principles of the disclosure. The specific design features of the present disclosure as described herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosed systems and methods will be described in conjunction with example embodiments, it will be understood that present description is not intended to limit the invention to those example embodiments. On the contrary, the invention is intended to cover not only the example embodiments, but also various alternatives, modifications, equivalents and other embodiments, which may be included within the spirit and scope of the invention as defined by the claims.

Further, in the following detailed description, names of constituents, which are in the same relationship, are divided into "the first", "the second", etc., but the present disclosure is not necessarily limited to the order in the following description.

Still further, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, an example embodiment of the present disclosure is described in detail with reference to the accompanying drawings.

Figure 3:
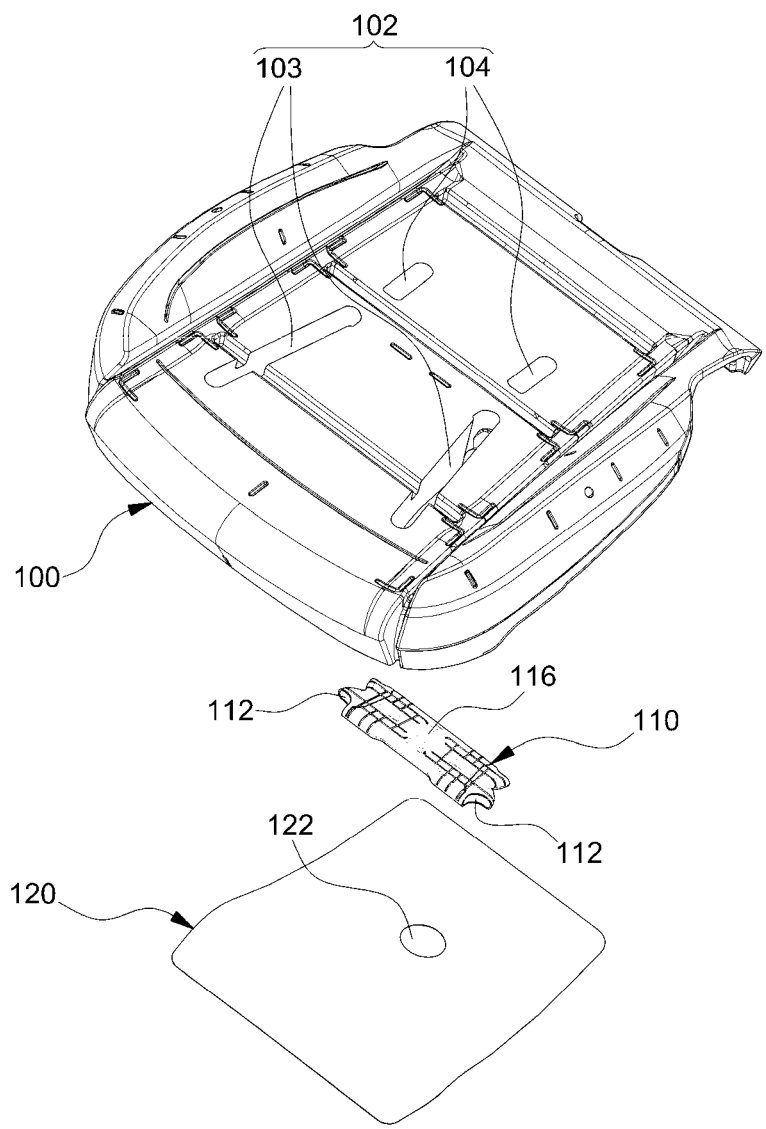
FIGS. 3 and 4 are exploded perspective views illustrating an example ventilation seat for a vehicle, according to an example embodiment of the present disclosure.
Figure 4:
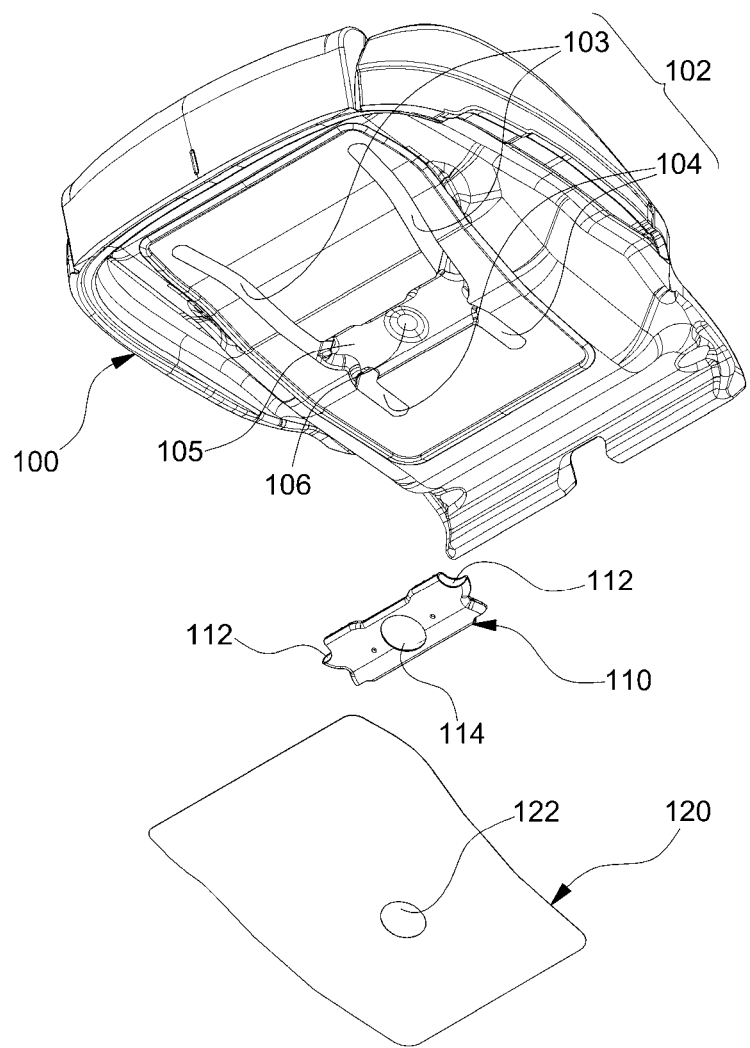
Figure 5:
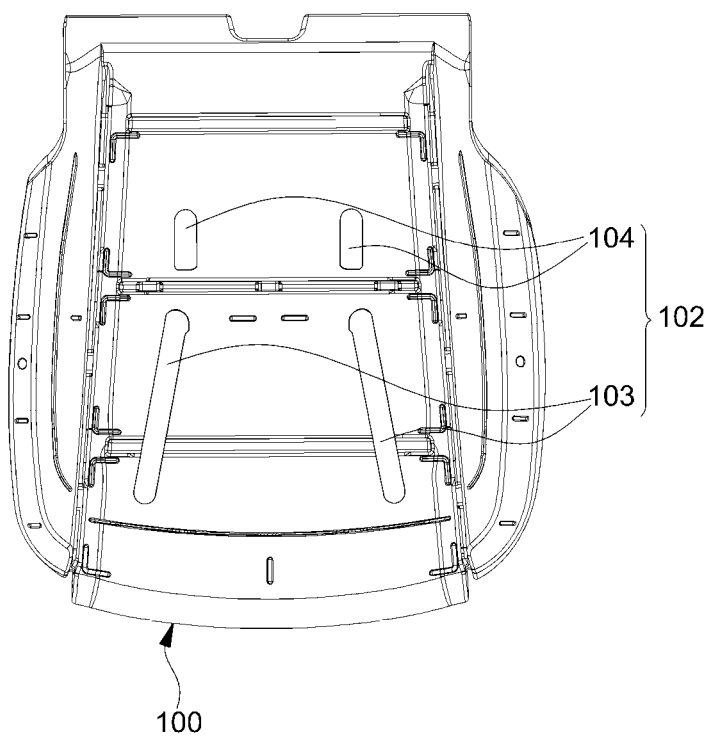
FIG. 5 is a plan view illustrating the example ventilation seat for the vehicle, according to an example embodiment of the present disclosure.
Figure 6:
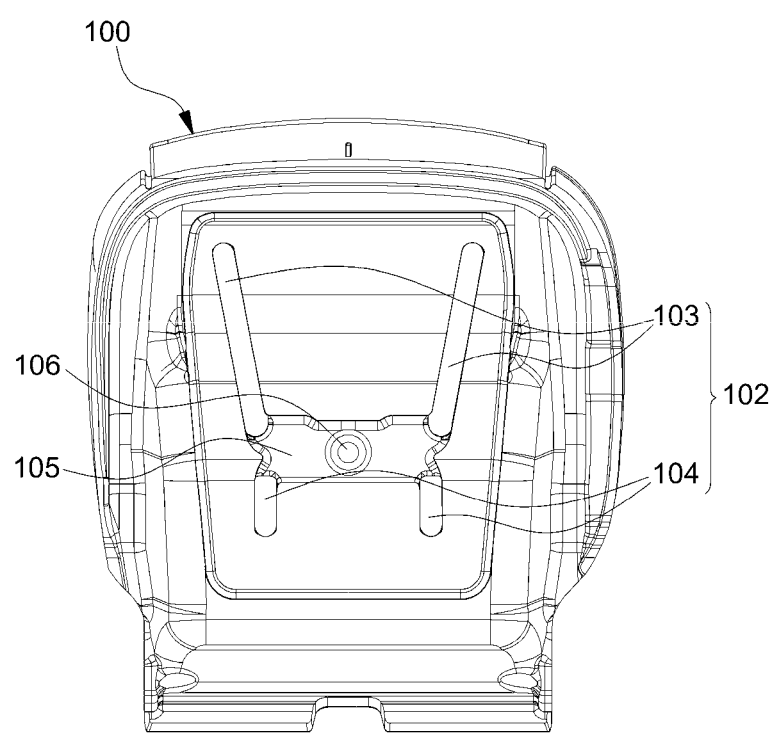
FIG. 6 is a bottom view illustrating the example ventilation seat for the vehicle, according to an example embodiment of the present disclosure.
Figure 7:
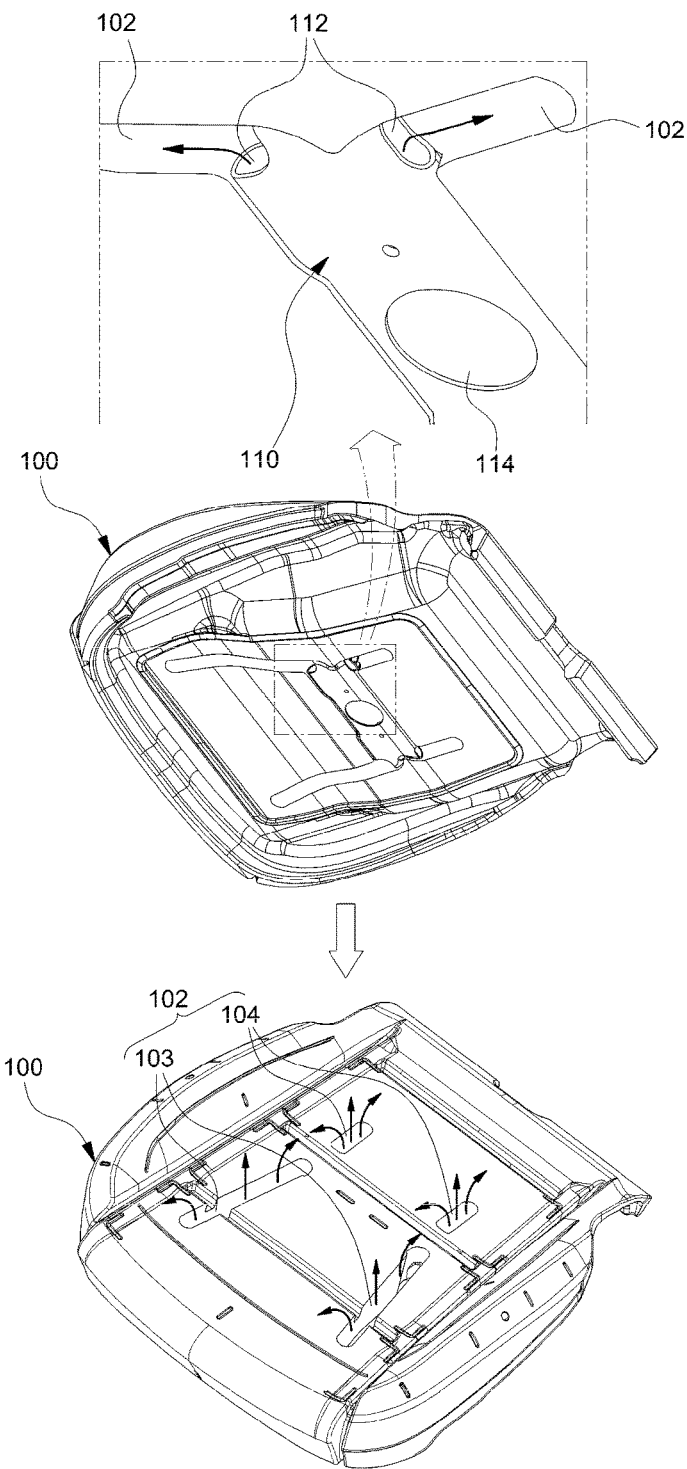
FIG. 7 is a perspective view showing the flow of air in the example ventilation seat for the vehicle, according to an example embodiment of the present disclosure.

FIGS. 3 and 4 are exploded perspective views illustrating an example ventilation seat for a vehicle, according to an example embodiment of the present disclosure. FIGS. 5 and 6 are, respectively, a plan view and a bottom view illustrating a seat pad according to an example embodiment of the present disclosure.

In FIGS. 3 to 6, reference numeral 100 denotes a seat pad for vehicles.

The seat pad 100 is not covered with an outer cover, and the seat pad 100 functions to provide cushion force for a seat. Particularly, the seat pad 100 functions to provide a passage through which air is discharged out of the seat to cool the ventilation seat.

According to the present disclosure, a through channel 102 is vertically formed in the seat pad 100 so that air is discharged toward the outside (a seat surface side that would make contact with the body of an occupant sitting in the seat) of the seat pad 100 through the through channel 102.

Particularly, the through channel 102 includes two or more rows of channels which extend in desired directions in an entire region of the seat pad 100. In an example embodiment, the entire region over which a through channel extends has a threshold length, such as at least 10% of a length of the seat pad 100. Other example threshold lengths are possible as well.

In an example embodiment, the through channel 102 may include (i) two or more rows of front through channels 103 which extend from a position at which the insert duct 110 is attached to the seat pad 100 toward a front portion of the seat pad 100 and (ii) two or more rows of rear through channels 104 which extend from a position at which the insert duct 110 is attached to the seat pad 100 toward a rear portion of the seat pad 100. The through channels 102 also may be formed to extend in other desired directions.

In an example embodiment, the entire region over which a front through channel 103 extends has a length of at least 25% of a length of the seat pad 100, and the entire region over which a rear through channel 104 extends has a length of at least 10% of a length of the seat pad 100. Other example lengths are possible as well.

Furthermore, the insert duct 110 is mounted to a first or lower surface of the seat pad 100 so that air is distributed into the through channels 102.

In an example embodiment, a duct insert depression 105 is formed in the lower surface of the seat pad 100 so that the insert duct 110 is seated in the duct insert depression 105. In other words, the insert duct 110 is installed in the lower surface of the seat pad 100 by inserting the insert duct 110 into the duct insert depression 105.

The depth of the duct insert depression 105 may be the same or substantially the same as the vertical thickness of the insert duct 110. The reason for this is to level a lower surface of the insert duct 110 with the lower surface of the seat pad 100 when the insert duct 110 is inserted into the duct insert depression 105.

A movement restriction depression 106 is formed in the bottom of the duct insert depression 105 of the seat pad 100 to guide the insert position of the insert duct 110 and restrict movement of the insert duct 110 after having been inserted into the duct insert depression 105.

As such, the insert duct 110 is a duct installed in the duct insert depression 105 of the seat pad 100 so as to distribute air into the through channels 102. The insert duct 110 has a hollow structure, in which air distribution holes 112, the number of which corresponds to the number of through channels, are respectively formed in four sides of the insert duct 110. Further, an air supply hole 114 is formed in the lower surface of the insert duct 110, so that an air supply unit (e.g., an air blower of an air conditioner) may be coupled to the air supply hole 114.

A movement restriction protrusion 116 inserted into the movement restriction depression 106 in the bottom of the duct insert depression 105, is provided on a second or upper surface of the insert duct 110.

Therefore, when the insert duct 110 is inserted and mounted in the duct insert depression 105 of the seat pad 100, the movement restriction protrusion 116 is inserted into the movement restriction depression 106. Because the movement restriction protrusion 116 is locked in the movement restriction depression 106, the insert duct 110 can be reliably fixed at the correct position to eliminate or limit moving forward, backward, leftward or rightward.

Because the insert duct 110 is fixed at the correct position thereof, the air distribution holes 112 in the four sides of the insert duct 110 can be disposed at positions corresponding accurately to respective entrances of the through channels 102.

After the insert duct 110 is inserted into the duct insert depression 105 of the seat pad 100, a cover 120 covering the insert duct 110 is attached to the lower surface of the seat pad. The cover 120 may function to seal lower portions of the through channels 102, so that air can be prevented from leaking from the through channels 102.

Because the lower surface of the seat pad 100 is level with the lower surface of the insert duct 110, the cover 120 can be uniformly attached to the lower surfaces of the seat pad 100 and the insert duct 110.

An air inlet hole 122 corresponding to the air supply hole 114 in the lower surface of the insert duct 110 is formed in the cover 120 attached to the lower surfaces of the seat pad 100 and the insert duct 110.

In an example embodiment, the air supply unit (e.g., the air blower of the air conditioner) is coupled, by a duct, to the air inlet hole 122 of the cover 120 and the air supply hole 114 of the insert duct 110.

An example embodiment of an air discharge process for a ventilation seat having the above-mentioned configuration is described in further detail below.

When air is sent from the air supply unit to the air inlet hole 122 of the cover 120 and the air supply hole 114 of the insert duct 110, the air is drawn into the insert duct 110.

Thereafter, air that is drawn into the insert duct 110 is distributed into the through channels 102 through the air distribution holes 112 formed in the four sides of the insert duct 110.

Subsequently, air distributed into the through channels 102 is discharged to the outside (the surface of the seat in contact with the body of the occupant) through open upper portions of the through channels 102, thus providing fresh air to the occupant.

Because the through channels 102 extend in desired directions in the entire region of the seat pad 100, the channels can be easily prevented from being blocked due to the weight of the occupant, thus maximizing or increasing the air discharge rate.

In the conventional channel-type ventilation seat or mat-type ventilation seat, because an air discharge hole through which air is finally discharged to the outside is a small circular hole, the air discharge hole may be deformed and blocked by the weight of the occupant, significantly reducing the air discharge rate. However, in the present disclosure, each of the through channels 102 formed in the seat pad 100 has an elongated line shape having a constant or substantially constant width. Therefore, the through channel 102 is prevented from being blocked by the weight of the occupant, and air can be smoothly discharged from the through channels, whereby the air discharge rate can be increased or maximized.

Furthermore, the conventional channel-type ventilation seat or mat-type ventilation seat is configured such that a separate laminated structure such as a slab, a non-woven fabric, or a mat must be placed on the seat pad to discharge air out of the seat pad. Therefore, existing conventional systems require a higher number of parts, and thus the production cost is also increased. However, in embodiments of the present disclosure, there is not a need to place a separate laminated structure on the seat pad 100, and only the through channels 102 are formed to discharge air out of the seat pad 100. Therefore, the present disclosure provides advantages in that the number of parts and the production cost can be reduced compared to existing conventional systems.

As described above, example embodiments of the present disclosure have the following effects.

First, because through channels that are vertically formed in a seat pad extend in desired directions in the entire region of the seat pad, the channels can be prevented from being blocked by the weight of an occupant.

That is, in the conventional channel-type ventilation seat or mat-type ventilation seat, because an air discharge hole through which air is finally discharged to the outside is a small circular hole, the air discharge hole may be deformed and blocked by the weight of the occupant. However, in the present disclosure, the elongated through channels that pass through the seat pad are directly formed in the entire region of the seat pad. Therefore, the through channels are prevented from being blocked even by the weight of the occupant.

Second, because the air discharge hole used in the conventional channel-type ventilation seat or mat-type ventilation seat is a small circular hole, the air discharge rate is comparatively low, and the amount of air that is discharged may further reduce, for example, because of the air discharge hole being blocked. However, in the present disclosure, air can be easily discharged through the through channels formed in the entire region of the seat pad, increasing or maximizing the air discharge rate can as compared to existing conventional ventilation seats.

Third, because the conventional channel-type ventilation seat or mat-type ventilation seat is configured such that a separate laminated structure such as a slab, a non-woven fabric or a mat is placed on the seat pad, the number of parts is increased, and the production cost is also increased. However, in the present disclosure, there is no need to place a separate laminated structure on the seat pad, and only an insert duct is mounted in the lower surface of the seat pad. Therefore, there are advantages in that the number of parts and the production cost can be reduced.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A ventilation seat for a vehicle, the ventilation seat comprising:
   a seat pad comprising two or more rows of through channels that extend from a front portion of the seat pad to a rear portion of the seat pad and vertically pass through the seat pad;
   an insert duct attached to a lower surface of the seat pad, wherein the insert duct distributes air into the through channels;
   a cover having an air inlet hole through which air is supplied into the insert duct, wherein the cover is attached to the lower surface of the seat pad while covering the insert duct;
   a duct insert depression in the lower surface of the seat pad, wherein the insert duct is inserted and seated in the duct insert depression; and
   a movement restriction depression configured to restrict movement of the insert duct, wherein the movement restriction depression is formed in a bottom of the duct insert depression of the seat pad.

2. The ventilation seat of claim 1, wherein the through channels comprise:
   two or more rows of front through channels extending from a position at which the insert duct is attached to the seat pad toward the front portion of the seat pad; and
   two or more rows of rear through channels extending from the position at which the insert duct is attached to the seat pad toward the rear portion of the seat pad.

3. The ventilation seat of claim 1, further comprising air distribution holes connecting the insert duct and the two or more rows of through channels, wherein the insert duct has a hollow structure with air distribution holes, wherein the air distribution holes are formed at the insert duct, wherein the number of air distribution holes corresponds to the number of through channels, and wherein the insert duct comprises an air supply hole formed in a lower surface of the insert duct and configured to be coupled with an air supply.

4. The ventilation seat of claim 1, wherein a depth of the duct insert depression is substantially the same as a vertical thickness of the insert duct.

5. The ventilation seat of claim 1, further comprising a movement restriction protrusion configured to be inserted into the movement restriction depression, wherein the movement restriction protrusion is formed on an upper surface of the insert duct.

* * * * *